United States Patent
Richter

(10) Patent No.: US 9,120,438 B2
(45) Date of Patent: Sep. 1, 2015

(54) APPARATUS CARRIER WITH PIVOT ARM AND SUCTION FOOT

(71) Applicant: Harald Richter, Engelsbrand (DE)

(72) Inventor: Harald Richter, Engelsbrand (DE)

( * ) Notice: Subject to any disclaimer, the term of this patent is extended or adjusted under 35 U.S.C. 154(b) by 0 days.

(21) Appl. No.: 14/222,625

(22) Filed: Mar. 22, 2014

(65) Prior Publication Data

US 2015/0069195 A1   Mar. 12, 2015

(30) Foreign Application Priority Data

Sep. 11, 2013 (DE) .......................... 10 2013 014 921

(51) Int. Cl.
| | |
|---|---|
| *A45D 42/14* | (2006.01) |
| *B60R 11/02* | (2006.01) |
| *F16M 11/22* | (2006.01) |
| *B60R 11/00* | (2006.01) |

(52) U.S. Cl.
CPC ............ *B60R 11/0241* (2013.01); *B60R 11/02* (2013.01); *F16M 11/22* (2013.01); *B60R 2011/0056* (2013.01); *B60R 2011/0071* (2013.01); *B60R 2011/0085* (2013.01)

(58) Field of Classification Search
USPC .......... 248/205.5, 205.7, 206.3, 205.8, 205.9, 248/206.1, 918
See application file for complete search history.

(56) References Cited

U.S. PATENT DOCUMENTS

| | | | | |
|---|---|---|---|---|
| 7,178,771 | B2 * | 2/2007 | Richter ...................... | 248/205.8 |
| 7,344,114 | B2 * | 3/2008 | Richter ...................... | 248/205.5 |
| 7,735,791 | B2 * | 6/2010 | Bury .......................... | 248/205.5 |
| 7,878,467 | B2 * | 2/2011 | Chen et al. ................. | 248/206.2 |
| 8,317,152 | B1 * | 11/2012 | Zhou ............................. | 248/596 |
| 2004/0256529 | A1 * | 12/2004 | Richter ...................... | 248/309.1 |
| 2006/0113434 | A1 * | 6/2006 | Richter ......................... | 248/121 |

* cited by examiner

*Primary Examiner* — Steven Marsh
(74) *Attorney, Agent, or Firm* — Klaus J. Bach

(57) ABSTRACT

In an apparatus carrier for supporting cell phones and similar apparatus, including a suction foot on which a pivot arm is pivotally supported at one end thereof and provided with than apparatus holder at the opposite end and the suction foot has a housing with a suction membrane extending across a housing opening, the suction membrane is operatively connected to the pivot arm so as to be movable, by pivoting of the operating arm between a release position in which the suction membrane extends straight across the housing opening and a suction position in which the suction membrane is arched into the suction housing opening.

10 Claims, 3 Drawing Sheets

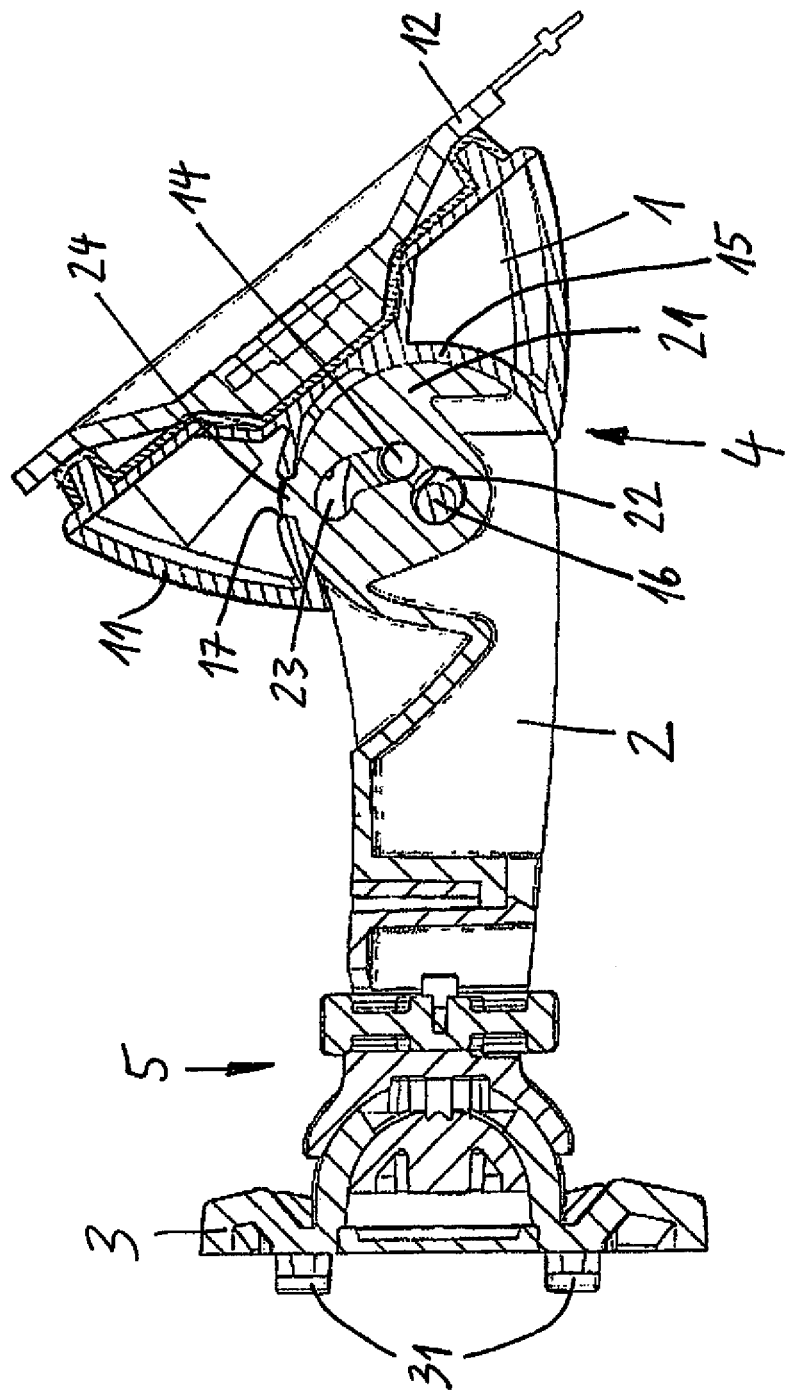

APPARATUS CARRIER WITH PIVOT ARM AND SUCTION FOOT

BACKGROUND OF THE INVENTION

The invention resides in an apparatus carrier with a pivot arm including a suction foot for supporting in particular cell phones.

Such apparatus carriers are basically known. They include a suction foot by which the apparatus carrier can be attached for example to the windshield of a motor vehicle. They often have a pivot arm which is connected with one end to the housing of the suction foot by means of a mounting hinge and which carries at its other, free, end attached by another hinge a mounting plate, to which a clamping plate holder arm or other adapter for holding a cell phone or similar apparatus can be mounted. The mounting hinge generally is arranged in a suction foot housing projection.

For actuating the suction foot to fix it to, or release it from, its mounting surface, generally an operating lever is provided in the form of a pivot lever which is connected to a shaft fixed to a suction membrane of the suction foot so that, by actuating the operating lever the suction membrane can be pulled into the suction housing into an arched suction position or moved to a suction-free flat position adjacent the mounting surface.

It is the object of the present invention to provide a design for an apparatus carrier of the type referred to above which is novel, elegant and easy to use.

SUMMARY OF THE INVENTION

In an apparatus carrier for supporting cell phones and similar apparatus including a suction foot on which a pivot arm is pivotally supported at one end thereof and provided with an apparatus holder at the opposite end and the suction foot has a housing with a suction membrane extending across a housing opening, the suction membrane is operatively connected to the pivot arm so as to be movable, by pivoting of the operating arm between a release position in which the suction membrane extends straight across the housing opening and a suction position in which the suction membrane is arched into the suction housing opening.

In the apparatus according to the invention the operating lever required so far to be activated for the attachment of the apparatus to a support surface is omitted and, instead, the pivot arm of the apparatus carrier, which supports the apparatus holder, forms at the some time an operating lever. The advantage resides in the fact that, instead of the small lever which is difficult to access under the pivot arm in the form of a small contact plate, the much larger and easier accessible pivot arm is available to the user for actuating the suction foot. This is also convenient because the pivot arm forms a much larger lever which requires a smaller force to actuate the suction foot membrane. This, furthermore, permits the provision of a suction foot with a relatively large membrane stroke and a large suction volume which provides for a large engagement force but also requires a larger actuating force that can now be generated by the larger operating lever.

The invention will become more readily apparent from the following description of an exemplary embodiment thereof with reference, to the accompanying drawings.

BRIEF DESCRIPTION OF THE DRAWINGS

FIG. 3 is a cross-sectional view of the apparatus carrier with the pivot arm in the suction position in which the membrane is pulled into the foot housing.

DESCRIPTION OF AN EXEMPLARY EMBODIMENT

Figure 1:
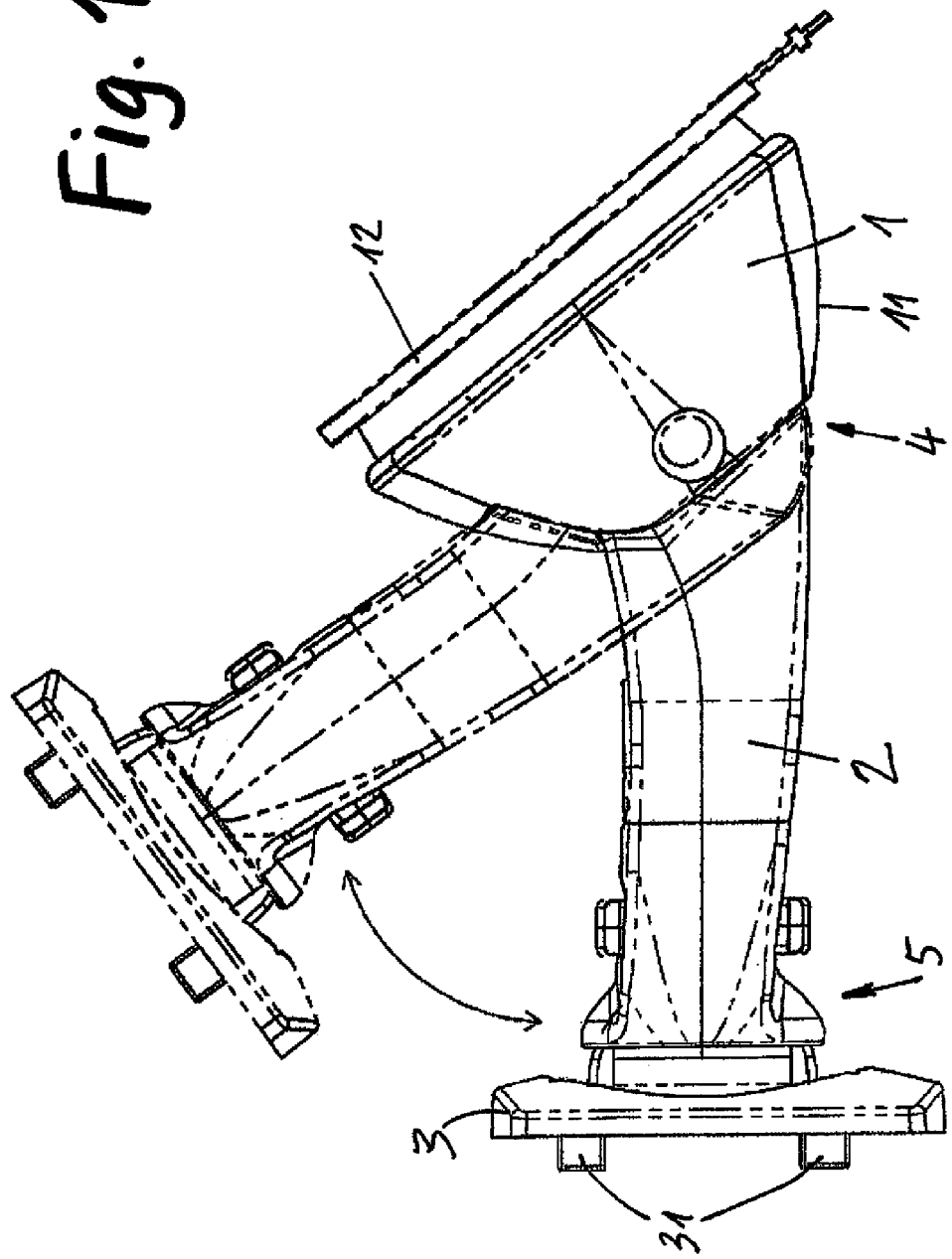
FIG. 1 is a side view of the apparatus carrier according to the invention wherein the pivot arm is shown in the release position in dashed lines and in the suction position by full lines.

The apparatus carrier according to the invention consists of a suction foot 1, a pivot arm 2 and a mounting plate 3. The pivot arm 2 forms at the same time the operating lever for the suction foot 1 and is connected to the suction foot by way of hinge 4. The mounting plate 3 is connected to the free end of the pivot arm remote from the suction foot by a universal joint 5.

Figure 2:
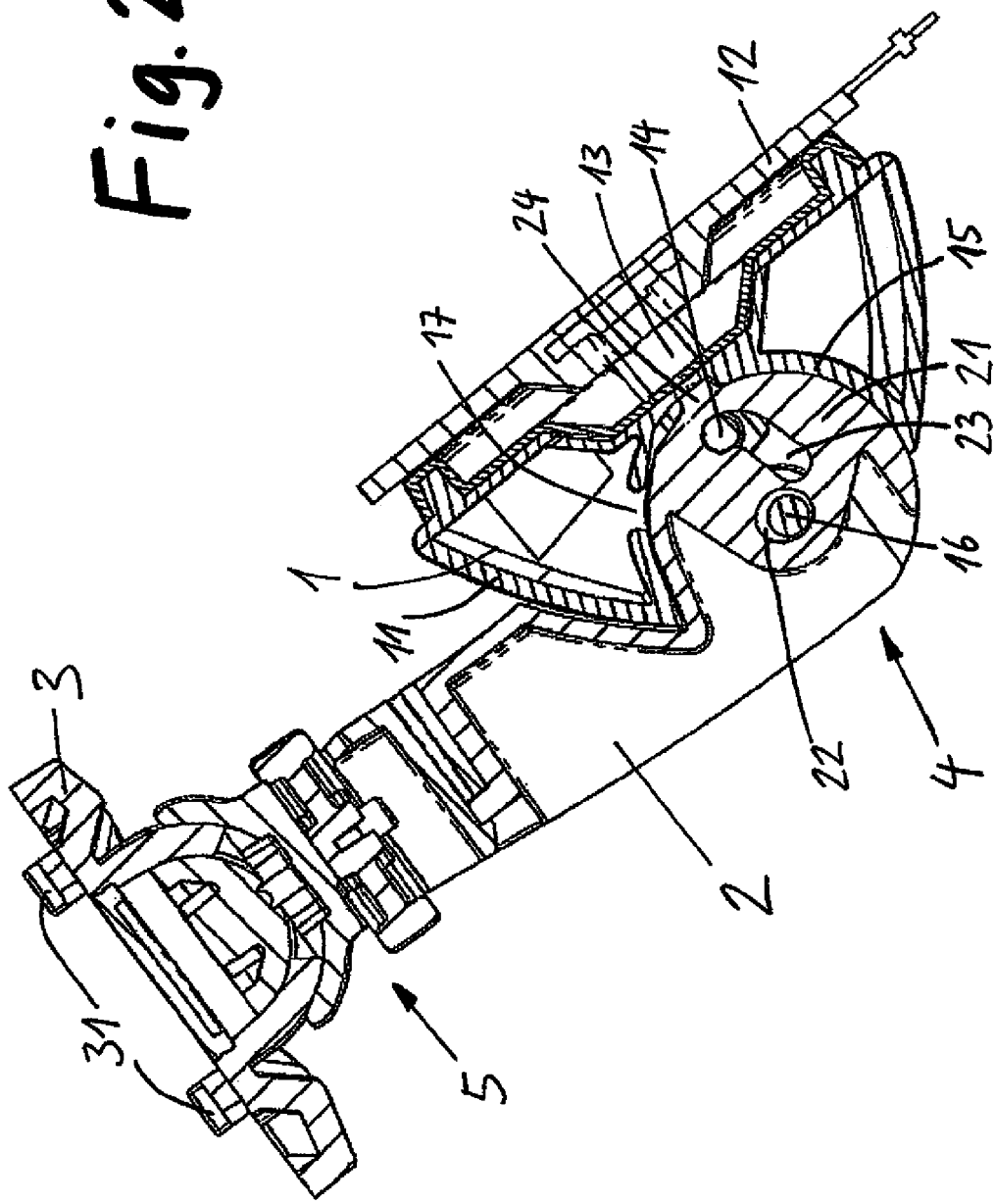
FIG. 2 is cross-sectional view of the apparatus carrier with the pivot arm in the release position.

As best apparent from the sectional view of FIG. 2, the suction foot 1 comprises a suction housing 11 defining a hollow chamber which is closed at its bottom end by a suction membrane 12. The suction membrane 12 is connected at its center to an operating shaft 13 which is coupled by a transverse pin 14 with the pivot arm 2 for moving the suction membrane 12 by moving the pivot arm between its release position and a suction position and, in accordance therewith, the suction membrane 12 between a flat rest position and an operating position in which it is arched into the suction housing 11 (suction position).

The mounting plate 3 is provided with claws 31 for coupling the mounting plate 3 with an apparatus holder, for example a clamping jaw holder or a support shell. The mounting plate 3 may also be directly coupled with an apparatus if the apparatus is provided with complementary openings or slots for accommodating the claws. Instead of the mounting plate 3—which is not essential with regard to the present invention also another connecting part may be provided for engaging an apparatus holder or directly an apparatus.

The mounting plate 3 or, alternatively, any connecting part is, in the exemplary embodiment, connected to the end of the pivot arm 2 via a joint, particularly a universal joint 5. Also, the universal joint is not an essential part as far as the invention is concerned. Another joint or other connection may be provided together with the mounting plate or other connecting part as well.

Also, the configuration of the pivot arm specifically is not essential for the invention. It may be straight or curved and it may be configured adapted to a particular application. The pivot arm 2 may also be an extendable telescopic arm or it may comprise sections which are interconnected by pivot joints.

The essential concept of the present invention resides in the design of the pivot arm 2 as an operating lever for the suction membrane in the suction foot 1. To this end, the pivot arm. 2 is connected to the suction foot by a hinge which is formed in the exemplary embodiment at the end of the pivot arm 2 next to the suction foot by a hinge part 21. The suction foot has a hinge socket area 15 receiving the hinge part 21, which is provided with a hinge pin-receiving opening 22. The pivot arm further has a hinge pin accommodation opening 22 receiving the hinge pin 16 which is arranged on the suction foot and extends into the hinge pin accommodation opening. Preferably, the hinge part 21 is a forked part with two spaced legs which are disposed at opposite sides of the operating shaft 13 of the suction membrane 12, wherein each leg cooperates with an associated shell area 15 and a hinge pin 16 of the suction foot 1.

Furthermore, as shown in the sectional views of FIGS. 2 and 3, each leg of the hinge part 21 of the pivot arm 2 includes an elongated opening forming a guide path 23 into which the transverse pin 14 of the operating shaft 13 extends. This guide path extends from a point close to the center of the hinge part 2 that is close to the hinge axis formed by the hinge pin 16 in a close to radial direction to near the outer circumference of the hinge part 21 in such a way that, upon pivoting of the pivot arm 2 from the release position shown in FIG. 2 to the suction position as shown in FIG. 3, the transverse pin 14 is moved upwardly relative, to the suction housing 11 and, consequently, also the operating shaft 13 is moved upwardly so that the center part of the suction membrane 17 is arched into the housing part 11.

Upon pivoting of the pivot arm 2 from the suction position to the release position, the shaft 13 is lowered by the transverse pin 13 and the suction membrane is returned to its flat position.

As shown in FIG. 2, the guide path 23 is at its end close to the circumference of the hinge part 21 bent-over with regard to the main essentially straight almost radial area. In the release position as shown in FIG. 2, the transverse pin 14 of the shaft 13 is disposed in this bent-over end area which extends transverse to a radial line of the axis of the shaft. As a result, in the release position, the operating shaft 13 cannot be moved that is, it held in the release position and also the membrane is held in its planar release position as the upper flank of the guide path prevents movement of the operating shaft 13 and the membrane 12.

Consequently, the suction membrane 12 is forcefully held in its planar position so that the disadvantageous effect in time, by creeping deformation, temperature effects and similar, the suction membrane is deformed and is arched into the suction foot housing also an the release position, is prevented. As a result, at least to some degree the available membrane movement distance and consequently the available volume change below the suction membrane for generating a vacuum and a sufficient suction force is maintained for a relatively long time—in contrast co many conventional suction engagement structures because, in the release position of the operating lever—the deformed membrane tends to arch into the suction housing even against a small spring force of a normally provided return spring if this arching movement is not blocked.

As it is also shown in the drawings, the hinge pin 16 is disposed in the hinge pins accommodation opening 22 with a relatively large radial play. The reason herefor is that at the circumference of the hinge part 21, a radially projecting engagement at 24 is provided which is accommodated in an engagement opening 17 formed in the hinge shell area 15 of the suction foot whenever the pivot arm 2 is pivoted into its suction position, so that the pivot arm remains engaged in this position by this engagement, the pivot arm 2 is firmly held in the engaged position for holding a cell phone or another apparatus in position. For moving the pivot arm 2 into the release position, first a substantial force is required to overcome the engagement by a radial lifting of the hinge part 21, for which the play between the hinge pin 16 and the hinge pin accommodation opening 22 is required. The hinge pin shell area 15 of the suction foot is so designed that it cooperates with the hinge part elastically.

This can easily be realized with parts which consist of plastic material an because of the inherent elasticity of plastic materials, provide for the needed spring resiliency.

The arrangement of the engagement projection and the engagement opening may also be revered by providing the projection on the shell of the engagement foot 1 and the engagement opening in the circumference of the hinge part of the pivot arm 2. Alternatively, engagement means may also be provided at other locations of the hinge joint and the hinge parts.

What is claimed is:

1. An apparatus carrier for mounting on a smooth surface, said apparatus carrier comprising a suction foot (1), a pivot arm (2) having opposite ends and being connected with one end thereof to the suction foot (1) by means of a hinge joint (4) and a connecting part (3) arranged at the opposite end of the pivot arm remote from the suction foot (1) for mounting an apparatus holder or an apparatus, the suction foot (1) including a suction housing (11) with an opening and a flexible suction membrane (12) extending across the opening and being connected to an operating shaft (13), the pivot arm pivotally connected to the suction foot (1) by a pivot joint (4) being also connected to the operating shaft (13) so as to form at the same time an operating lever acting on the suction membrane (12) for moving the suction membrane (12) between a flat release position and a suction position in which the membrane is arched into the suction housing (11) of the suction foot (1) by pivoting the pivot arm (2).

2. The apparatus according to claim 1, wherein the hinge joint (4) includes joint parts (15, 21) which are provided with cooperating engagement structures (17, 24) arranged between the suction foot (1) and the pivot arm (2) for engaging the pivot arm (4) in its suction position.

3. The apparatus according to claim 2, wherein the hinge joint (4) includes hinge parts (15, 21) forming between the pivot arm (2) and the suction foot (1) a circular segment-shaped hinge joint section (21) and a complementary joint shell area (15) formed on the suction foot (1) in which the circular segment-shaped hinge joint section (21) is received.

4. The apparatus according to claim 3, wherein the engagement structure (17, 24) includes one of an engagement projection (24) arranged at the circumference of the circular segment-shaped hinge joint section (21) of the pivot arm (2) in combination with an engagement recess (17) arranged in the joint shell area (15) of the suction foot (1) and an engagement projection provided on the joint shell area (15) of the suction foot in combination with an engagement recess provided at the circumference of the circular segment-shaped hinge joint section of the pivot arm (2).

5. The apparatus according to claim 3, wherein the pivot arm (2) is coupled to the operating shaft (13) of the suction membrane (12) by a transverse pin (14) and a guide structure (23) formed on the circular segment-shaped hinge joint section (21).

6. The apparatus according to claim 5, wherein the guide structure (23) is an elongated guide opening (23) formed in the circular segment-shaped hinge joint section (21) into which the transverse pin (14) extends, the elongated guide opening (23) including an end area near the pivot axis of the hinge joint (4) in which the transverse pin (14) is disposed in the suction position and an end area remote from the pivot axis of the hinge joint (4) near the circumference of the hinge joint section (21) where the transverse pin (14) is in the release position.

7. The apparatus according to claim 6, wherein the end area of the elongated guide opening receiving the transverse pin (14) in the release position extends essentially transverse to a radial line of the shaft (16) of the suction membrane (12) so that, in the release position of the pivot arm (2), the operating shaft (13) and, together therewith, the suction membrane (12) is prevented from moving into the suction housing (11) of the suction foot (1) by a cooperation of the transverse pin (14) and the guide opening (23).

8. The apparatus according to claim 7, wherein the end area of the elongated guide opening (23) in which the transverse pin (14) is received in the release position is bent over with respect to orientation of the remainder of the elongated guide opening (23).

9. The apparatus according to claim 3, wherein the hinge joint section (21) of the pivot arm (2) and the operating shaft (13) of the suction membrane (12) are provided with cooperating blocking elements which, upon movement of the pivot atm (2) into the release position are moved into engagement with one another so as to prevent, in the release position, a movement of the operating shaft (13) and the suction membrane (12) toward the suction housing (11) of the suction foot (1).

10. The apparatus according to claim 3, wherein the hinge joint (4) is provided with a hinge pin (16) disposed on the suction foot (1) and supporting the pivot, arm (2), and the circular segment-shaped hinge joint section (21) includes a hinge pin accommodating opening (22) which is larger in cross-section than the hinge pin (16) so as to provide for some radial play between the hinge pin (16) on the hinge pin accommodating opening (22).

\* \* \* \* \*